(12) United States Patent
Bruder et al.

(10) Patent No.: US 11,203,723 B2
(45) Date of Patent: Dec. 21, 2021

(54) METHOD AND SYSTEM FOR OBTAINING POLYMERIZABLE AROMATIC COMPOUNDS

(71) Applicant: LINDE GmbH, Pullach (DE)

(72) Inventors: David Bruder, Munich (DE); Helmut Fritz, Munich (DE)

(73) Assignee: LINDE GmbH, Pullach (DE)

( * ) Notice: Subject to any disclaimer, the term of this patent is extended or adjusted under 35 U.S.C. 154(b) by 25 days.

(21) Appl. No.: 16/766,601

(22) PCT Filed: Nov. 23, 2018

(86) PCT No.: PCT/EP2018/082430
§ 371 (c)(1),
(2) Date: May 22, 2020

(87) PCT Pub. No.: WO2019/101957
PCT Pub. Date: May 31, 2019

(65) Prior Publication Data
US 2020/0369969 A1    Nov. 26, 2020

(30) Foreign Application Priority Data
Nov. 23, 2017   (EP) ..................... 17203410

(51) Int. Cl.
  *C10G 55/04*   (2006.01)
  *B01D 3/32*   (2006.01)
  (Continued)

(52) U.S. Cl.
  CPC ............... *C10G 55/04* (2013.01); *B01D 3/32* (2013.01); *B01D 5/0063* (2013.01); *C10G 9/36* (2013.01);
  (Continued)

(58) Field of Classification Search
None
See application file for complete search history.

(56) References Cited

U.S. PATENT DOCUMENTS 6,677,496 B2 * 1/2004 Netzer .................. C10G 69/12
                                                          208/130
2008/0249341 A1   10/2008 Tsao et al.
(Continued)

FOREIGN PATENT DOCUMENTS

EP    0602302 A1   6/1994
EP    3278860 A1   2/2018

OTHER PUBLICATIONS

PCT/EP2018/082430 International Search Report dated Jan. 29, 2019; 2 pages.

*Primary Examiner* — Tam M Nguyen
(74) *Attorney, Agent, or Firm* — Lathrop GPM LLP (57) ABSTRACT

The invention relates to a process (100) for deriving polymerizable aromatic compounds having nine carbon atoms (S) in which a component mixture (B) is formed at least partially by steam cracking, in which the component mixture (B) is subjected to a workup (2, 3, 4, 5) comprising a gasoline removal (5) and thereafter is a compression (8) and a fractionation (10), and wherein one or more pyrolysis gasoline fractions (H, L) is or are formed in the gasoline removal (5) and/or the compression (8). The invention provides that a separation feed is formed which comprises predominantly exclusively pyrolysis gasoline from the or at least one of the pyrolysis gasoline fractions (H, L) and that the separation feed is subjected to a separation (7), wherein in the separation (7) at least one fraction (P) enriched in aromatic compounds having nine carbon atoms compared to the separation feed is formed. A corresponding plant likewise forms part of the subject matter of the invention.

13 Claims, 3 Drawing Sheets

(51) Int. Cl.
 *B01D 5/00* (2006.01)
 *C10G 9/36* (2006.01)
(52) U.S. Cl.
 CPC . *C10G 2300/1044* (2013.01); *C10G 2400/30* (2013.01)

(56) References Cited

U.S. PATENT DOCUMENTS

| | | | |
|---|---|---|---|
| 2012/0048714 A1 | 3/2012 | Werba et al. | |
| 2015/0275103 A1* | 10/2015 | Yanagawa | B01J 8/02 585/251 |
| 2016/0024400 A1* | 1/2016 | Iwasa | B01J 27/19 585/476 |
| 2016/0369190 A1* | 12/2016 | Ward | C10G 67/00 |
| 2019/0382672 A1* | 12/2019 | Sorensen | C10L 1/1691 |

* cited by examiner

METHOD AND SYSTEM FOR OBTAINING POLYMERIZABLE AROMATIC COMPOUNDS

The invention relates to a process for deriving polymerizable aromatic compounds having nine carbon atoms and to a corresponding plant according to the preamble of the independent claims.

PRIOR ART

Processes and plants for steam cracking of hydrocarbons are described for example in the article "Ethylene" in Ullmann's Encyclopedia of Industrial Chemistry, Online Edition, 15 Apr. 2009, DOI: 10.1002/14356007.a10_045.pub2. Steam cracking is used predominantly to derive short-chain olefins such as ethylene and propylene, diolefins such as butadiene or aromatics, but is not limited thereto.

Withdrawn from the cracking furnaces employed in corresponding processes and plants are component mixtures that are subjected to suitable workup sequences. This comprises performing in a front-end section initially a removal of heavy compounds, if present, and then in particular a so-called crude gas compression and an acid gas removal. Performed after the workup in the front-end section is a fractionation in which different hydrocarbon fractions are formed by thermal separation processes. For details see the abovementioned article "Ethylene" in Ullmann's Encyclopedia of Industrial Chemistry, in particular section 5.3.2.1, "Front-End Section", and section 5.3.2.2, "Hydrocarbon Fractionation Section".

Heavy compounds are obtained in the abovementioned front-end section in particular in the form of one or more so-called pyrolysis oil fractions and a so-called (heavy) pyrolysis gasoline fraction. The heavy pyrolysis gasoline fraction is particularly formed in a water wash, which is part of the front-end section. Heavy compounds are formed in particular when heavy (liquid) hydrocarbon inputs such as naphtha are at least partially employed but are not formed or formed only to a small extent when using predominantly or exclusively light (gaseous) inputs.

The pyrolysis oil fraction(s) is/are separated in the front-end section of the workup sequence in a primary fractionation while the pyrolysis gasoline fraction is separated predominantly in one of the water quench columns arranged downstream of the primary fractionation or in other devices. Typically employed in the primary fractionation are circulating oil and a portion of the pyrolysis gasoline fraction.

An excess of the pyrolysis gasoline fraction may be otherwise used, in particular after stripping of any light compounds still present. For example an extraction of aromatic compounds and a further fractionation and workup to afford fuel may be carried out. Also in downstream steps of the front-end section, in particular the crude gas compression, and in the subsequent separation, for example in a debutanizer, (light) pyrolysis gasoline may still be separated and used for forming the pyrolysis gasoline fraction. However as elucidated hereinbelow this is carried out only to a limited extent in the context of the present invention and preferably not at all.

The term "Pyrolysis oil" is here to be understood as meaning a fraction of a component mixture formed at least partially by steam cracking which contains predominantly or exclusively, i.e. to an extent of at least 75%, 80%, 90% oder 95%, compounds having a boiling point higher than 200° C. As mentioned, it is also possible for a plurality of pyrolysis oil fractions to be formed, in particular a so-called pyrolysis gasoil fraction and a pyrolysis fuel oil fraction, which differ in the boiling points of the compounds present. The pyrolysis gas oil fraction ("light pyrolysis oil") and the pyrolysis fuel oil fraction ("heavy pyrolysis oil") are typically extracted at different positions in a so-called oil column, which is part of the front-end section mentioned above.

As mentioned, pyrolysis gasoline can be obtained at different positions in the recovery process, to which a mixture of components obtained by steam cracking is subjected. "Heavy pyrolysis gasoline" is here to be understood as meaning a fraction of a component mixture formed at least partially by steam cracking which contains predominantly or exclusively, i.e. to an extent of at least 75%, 80%, 90% oder 95%, compounds having five to twelve or five to ten carbon atoms and a boiling point below 200° C. In particular heavy pyrolysis gasoline contains considerable amounts of aromatic compounds. Further pyrolysis gasoline fractions are derivable from the heavy pyrolysis gasoline. Heavy pyrolysis gasoline can, as mentioned, be obtained in a water wash, which is part of the front-end section, whereas light pyrolysis gasoline can be formed in subsequent stages of processing, i.e. fractionation, especially in a debutanizer.

In addition to the primary target products, in particular ethylene, steam cracking also affords further valuable compounds which are advantageously derivable individually or together, i.e. in the form of corresponding fractions. While US 2012/0048714 A1 refers to energy improvements in the production of xylenes in the so-called aromatics complex of a refinery and US 2008/0249341 A1 discloses a process for the production of high-energy fuel, the present invention relates to the derivation of polymerizable aromatic compounds having nine carbon atoms such as are also elucidated in detail hereinbelow.

The present invention has for its object to improve said deriving polymerisable aromatic compounds having nine carbon atoms from a component mixture formed at least partially by steam cracking.

DISCLOSURE OF THE INVENTION

This object is achieved by a process for deriving polymerizable aromatic compounds having nine carbon atoms and a corresponding plant having the features of the independent claims. Embodiments are in each case provided by the dependent claims and the description which follows.

Before elucidation of the advantages of the present invention, a number of the terms used in the description of the invention are more particularly defined hereinbelow.

Component mixtures may in the context of the present usage be rich or poor in one or more components, wherein the term "rich" may stand for a content of not less than 75%, 80%, 90%, 95% or 99% and the term "poor" may stand for a content of not more than 25%, 20%, 10%, 5% or 1% on a molar, weight or volume basis. Component mixtures may in the context of the present usage further be enriched or depleted in one or more components, wherein these terms relate to a corresponding content of another component mixture which has been used to form the considered component mixture. The component mixture concerned is "enriched" when it comprises not less than 1.5 times, 2 times, 5 times, 10 times, 100 times or 1000 times the content of the described component(s) and "depleted" when it comprises not more than 0.75 times, 0.5 times, 0.1 times, 0.01 times or 0.001 times the content of the described component(s). A component mixture containing "predominantly" one or more components is in particular rich in this or these components in the sense elucidated just now.

When reference is made to a component mixture being "formed" using another component mixture this is to be understood as meaning that the component mixture concerned comprises at least some of the components that are present in the other component mixture or are formed therefrom. A forming of a component mixture from another may comprise for example a diverting of a portion of the component mixture, a supplying of one or more further components or component mixtures, a chemical or physical conversion of at least some components and a heating, cooling, evaporating, condensing etc. A "forming" of a component mixture from another component mixture may however also comprise merely the provision of the other component mixture in a suitable form, for example in a container or a conduit.

The terms "pressure level" and "temperature level" are used in the present invention to characterize pressures and temperatures, these being intended to express that corresponding pressures and temperatures need not be used in a corresponding plant in the form of exact pressure/temperature values. However, such pressures and temperatures typically vary within particular ranges of, for example, ±1%, 5%, 10%, 20% or 25% around an average value. Corresponding pressure levels and temperature levels may lie in disjoint ranges or in overlapping ranges. The same pressure level may for example also prevail when unavoidable pressure drops occur. The same holds for temperature levels. The pressure levels indicated here in bar are absolute pressures.

For the design and specific configuration of all kinds of columns and other separation apparatuses as well as their internals, such as may also be employed in the context of the present invention, explicit reference is hereby made to the relevant technical literature (see for example Sattler, K.: Thermische Trennverfahren: Grundlagen, Auslegung, Apparate, 3rd edition, 2001, Weinheim, Wiley-VCH). In particular, appropriate separation apparatuses may comprise conventional separating trays, in particular in the form of structured metal trays with downflow means, or suitable packings.

Advantages of the Invention

Of great economic importance are polymerizable aromatic compounds, in particular those having nine carbon atoms, formed during steam cracking of liquid hydrocarbon inputs such as naphtha. These include indene and so-called vinyltoluenes (α-, o-, m-, p-methylstyrene, not β-methylstyrene) but also the resin monomer having ten carbon atoms methylindene. These so-called "actives" are used for example as starting materials in the production of adhesives. The boiling range of the recited compounds is from 166° C. (α-methylstyrene) to 203° C. (methylindene). The compounds having nine carbon atoms are flanked by styrene (boiling point 145° C.) which is likewise an "active" and is acceptable up to a certain proportion in a corresponding mixture and also naphthalene (boiling point 220° C.) which is an undesired disruptive component. Also formed during the cracking are (unimportant) concomitant components in the recited boiling range (in particular saturated aromatics). Additionally formed by dimerization of cyclopentadiene and methylcyclopentadiene are disruptive components, in particular cyclopentadiene and dimers thereof (DCPD), for example endo- and exo-DCPD, methyl-DCPD, and dimethyl-DCPD. In respect of further details and for typical compositions of corresponding fractions, reference is made to the relevant technical literature, for example Mildenberg et al., "Hydrocarbon Resins", VCH 1997, in particular section 2.2.1, "Aromatic Hydrocarbon Resins".

If reference is made hereinbelow to "polymerizable aromatic compounds" this is to be understood as meaning in particular the compounds of the recited type present in typical C9 resin oils, in particular the recited actives. When reference is made to polymerizable aromatic compounds having nine carbon atoms being derived this is to be understood as also meaning in particular that a fraction is derived which contains these polymerizable aromatic compounds in a significant proportion but may also contain other compounds such as the recited other components, in particular styrene and methylindene. The fraction may, after a distillation to obtain it, in particular contain more than 30, in particular more than 40 or more than 50 mol-% of these compounds and also contain compounds which cannot be separated thermally. After further extraction, such a fraction may be rich in the polymerizable aromatic compounds in the abovementioned sense.

The present invention proceeds from a known-per-se process for deriving polymerizable aromatic compounds having nine carbon atoms wherein a component mixture is formed at least partially by steam cracking. The present invention thus relates in particular to steam cracking processes in which, as mentioned, liquid or at least partially liquid/heavy inputs are used, in particular naphtha. However, it will be appreciated that corresponding processes may also be performed at least partially using light inputs. It is in particular a precondition for the process according to the invention that a component mixture formed by means of a corresponding steam cracking process contains the components previously elucidated in respect of pyrolysis gasoline to an extent that is appreciable and separable as elucidated in a front-end section.

As is well known per se, component mixtures at least partially obtained by steam cracking are subjected to a workup sequence comprising a gasoline removal and thereafter a to at least one compression and a fractionation. For further details reference is made to the elucidations in the introduction and the technical literature cited therein. As is likewise mentioned therein one or more pyrolysis gasoline fractions are formed in the course of the gasoline removal which is part of the workup and/or during the compression, i.e. before the actual (thermal) fractionation. One or more further pyrolysis gasoline fractions are typically formed downstream of the compression, i.e. in the fractionation. However, in the context of the present invention these particularly are not used.

The present invention is based on the realization that the derivation of the recited polymerizable aromatic compounds having nine carbon atoms from pyrolysis gasoline from the pyrolysis gasoline fraction(s) formed up to and including the crude gas compression, or a portion thereof, but particularly not from the pyrolysis gasoline fraction (s) which are formed downstream thereof offers particular advantages. In particular, the present invention provides the advantage that the derivation of the polymerizable aromatic compounds having nine carbon atoms has little if any influence on the core processes of a corresponding process. The derivation is thus largely independent from the core process, i.e. the deriving of the actual target products of the process for steam cracking such as for example ethylene and other aromatic compounds. The present invention thus overall further results in a low operating risk and a particularly high efficiency in the recovery of corresponding compounds/a high yield. The compounds may in particular be largely or completely free from disruptive/concomitant components that are separable only with difficulty. Such disruptive components are, for example, oil components, styrene and compounds that solidify at relatively moderate temperatures, especially naphthalene. The latter is contained in the pyrolysis gasoline used in the context of the present invention in no more than 5 mol-%. According to the present invention, in summary, it has been surprisingly found that heavy pyrolysis gasoline can be advantageously used for obtaining polymerizable aromatic compounds having nine carbon atoms. Another advantage of using heavy pyrolysis gasoline is that downstream hydrogenation steps are protected from contamination with interfering components.

Since the derivation has only a small influence, if any, on the core processes of the process, the process proposed according to the invention may also be retrofitted to existing plants in particularly simple and cost-effective fashion without other plant parts requiring adaptation. As a result of the high efficiency in the recovery and the derivation with little, if any, disruptive/concomitant components the economy of the process may overall be markedly improved compared to known processes.

It is also possible in principle to derive the elucidated polymerizable aromatic compounds having nine carbon atoms from a pyrolysis oil fraction in a corresponding process, as described for example in EP 0 602 302 A1. However, this is disadvantageous since, in contrast to the present invention, this affects the oil column and thus the core process. The withdrawal from the oil column alters the operating parameters and thus always influences the overall process. In other words the derivation of the polymerizable aromatic compounds having nine carbon atoms is not independent from the other processes. Furthermore, the composition of the fraction withdrawn from the oil column in EP 0 602 302 A1 is always very strongly dependent on the operating conditions and the composition of the cracking gas and may thus show little constancy. A corresponding fraction is moreover "contaminated" with heavier/lighter components at the heavy end and the light end while in the context of the present invention this is the case only in respect of the lighter compounds. Purification is therefore markedly simpler in the context of the present invention. The risk of plant parts becoming obstructed by the heavier compounds is also markedly reduced.

The present invention therefore suggests to form a separation feed comprising predominantly or exclusively pyrolysis gasoline from the or at least one of the pyrolysis gasoline fractions formed in the pyrolysis gasoline removal and/or during the compression, to subject the separation feed to a separation and to form, in the separation, a fraction which is enriched in polymerizable aromatic compounds having nine carbon atoms in the previously elucidated sense in relation to the separation feed. Since the separation feed is preferably composed predominantly or exclusively of pyrolysis gasoline from the or at least one of the pyrolysis gasoline fractions formed in the pyrolysis gasoline removal and/or during compression, the fraction obtained is also enriched in polymerizable aromatic compounds having nine carbon atoms with respect to this/these fraction(s). The separation may employ a conventional separating column as also elucidated hereinbelow. In the separation a heavy gasoline fraction is employed and a crude gasoline fraction is formed as tops product. A corresponding bottoms product contains oil components and dimers/oligomers and also a portion of compounds having nine carbon atoms and their concomitant components. The bottoms product is therefore advantageously recycled to an oil derivation/oil separation, so that the recited components are transferred into the light fraction of the oil separation and thus remain available for the subsequent derivation. As is also elucidated hereinbelow a stripping in particular may be employed here. However, the bottoms product can also be exported directly.

In the context of the present invention the fraction mentioned before is moreover preferably at least partially supplied to a further separation as a further separation feed, wherein in the further separation a further fraction is formed which is enriched in aromatic compounds with nine carbon atoms compared to further separation feed. The further fraction may also contain the polymerizable aromatic compounds in a content of, for example, more than 30, more than 40 or more than 50 mol-% and may be rich in these compounds in the sense explained above. The present invention according to this embodiment proposes a distillative process which comprises the connection of two separating steps and in particular two separating columns. In this way the number of required apparatuses may be minimized. The two separating steps/separating columns may in particular also be operated using common apparatuses/heating means and the like.

The abovementioned workup of the component mixture formed at least partially by steam cracking comprises an oil removal and a gasoline removal upstream of the compression, as mentioned already. The one or more pyrolysis fractions from which pyrolysis gasoline is at least partially supplied to the separation is or are formed in the gasoline removal and/or the compression. It is advantageous when no subsequently formed pyrolysis gasoline fractions or portions thereof are introduced into the preseparation.

In other words the fractionation also forms one or more further pyrolysis gasoline fractions, however the separation feed is poor in or free of pyrolysis gasoline from the one or more further pyrolysis gasoline fractions. This allows a particularly advantageous performance of the process according to the invention since in this way disruptive components such as (methyl)dicyclopentadiene and the other recited heavy disruptive components which are not distillatively separable or distillatively separable only with difficulty do not reach the fraction subjected to the separation. The pyrolysis gasoline fractions formed in the workup and the compression contain such compounds only in tolerable proportions.

It is particularly advantageous when the main proportion of polymerizable aromatic compounds having nine carbon atoms are transferred from the component mixture at least partially formed by steam cracking into the one or more pyrolysis gasoline fractions. This is the case particularly when a pyrolysis oil derived in a oil removal of the workup sequence is subjected to an oil stripping in which light compounds such as the recited polymerizable aromatic compounds having nine carbon atoms are stripped from the pyrolysis oil. In other words it is thus advantageous in the context of the present invention when in the oil removal a pyrolysis oil-containing fraction is formed, wherein in an oil stripping components are stripped out of the pyrolysis oil-containing fraction. These are advantageously recycled into the oil removal in gaseous form so that these may be transferred into a light fraction that is subsequently introduced into the gasoline removal. In the gasoline removal corresponding components including the polymerizable aromatic compounds having nine carbon atoms may be transferred into the pyrolysis gasoline.

In the context of the present invention it is advantageous when a gasoline stripping is also performed, i.e. when forming the one or more pyrolysis gasoline fraction comprises that one or more pyrolysis gasoline-containing fractions are formed in the gasoline removal and that the latter are at least partially subjected to a gasoline stripping where lighter components are stripped out of the fraction(s). In this way a depletion of lighter components and an improvement in the separation step(s) are achieved. It is noted that advantageously no pyrolysis gasoline formed in the fractionation downstream of the crude gas compression is introduced into a corresponding gasoline stripping either since this contains the recited disruptive components. It is likewise advantageous when no heavy components from a gasoline workup are employed since these can contain (methyl)dicyclopentadiene and/or hydrogenation products thereof and other representatives of the recited heavier disruptive components. In contrast, pyrolysis gasoline from downstream fractionation may contain these disruptive components.

In the gasoline stripping, the one or more pyrolysis gasoline fractions is or are advantageously at least partially formed in the gasoline stripping. However, it is also possible to supply to the separation a portion of pyrolysis gasoline formed in the previously elucidated steps without a corresponding gasoline stripping.

The separation is advantageously performed using a separating column comprising separating trays, wherein the intermediate fraction from the separating column is withdrawn via a sidestream takeoff. The withdrawal may preferably be effected in gaseous form, but in principle also in liquid form, as is elucidated with reference to the drawings. A corresponding separating column advantageously comprises conventional separating trays in the form of metal sheets having appropriate structuring/downflow means so that these may be provided particularly easily and cost-effectively.

The separation advantageously further forms a liquid bottoms product comprising predominantly or exclusively compounds having more than nine carbon atoms and a gaseous tops product comprising predominantly or exclusively compounds having less than nine carbon atoms.

The bottoms product from the preseparation contains oil components which are transferred into the pyrolysis gasoline fraction and in particular dimers or oligomers and, as mentioned, proportions of aromatic hydrocarbons having nine carbon atoms. This bottoms product is advantageously recycled into the oil separation as likewise already mentioned in order not to lose the proportion of such compounds. The bottoms product may in particular be introduced into an oil stripping where corresponding lighter compounds are stripped out. Alternatively, the bottoms product can be withdrawn directly, if desired.

The tops product from the separation is typically subjected to further processing in a downstream hydrogenation and for example utilized as a product for admixing into fuels and for aromatics extraction. It may in particular be combined with further fractions. Since the secondary components are no longer disruptive here the tops product may also be combined with pyrolysis gasoline fractions formed in the fractionation downstream of the crude gas compression. The intermediate fraction withdrawn from the separating column via a sidestream takeoff is supplied to the fine separation since this in particular still contains proportions of lighter disruptive/concomitant components, in particular styrene.

The further separation is in particular performed using a separating column into which in a middle region the intermediate fraction is introduced. This separating column may in particular comprise one or more packing sections. The invention is more particularly elucidated in detail with reference to the accompanying drawings. It may also be provided to use for the further separation a separating column which is fitted partially with a packing and partially with conventional separating trays as is more particularly elucidated in particular in connection with FIG. 2.

The further separation advantageously also forms a bottoms product and a tops product, wherein in the fine separation the product fraction is formed as the bottoms product. It will be appreciated that a corresponding bottoms product may also be subjected to further workup, for example further purification, to obtain a particularly pure product fraction. It is also possible to further fractionate the product fraction into individual components if this appears necessary. The further separation in particular makes it possible to separate and recycle the light disruptive/concomitant components still present in the intermediate fraction overhead. The tops product is in particular introduced into the separation/into a condenser/reflux system thereof.

It is advantageous when the separating columns used for the separation and for the further separation are each heated using bottoms evaporators in which a common heating medium, which may however have different temperatures, is employed. This may in particular be steam which is for example passed through a bottoms evaporator in the further separation and passed through a bottoms evaporator in the separation.

Both the separation and the further separation are in the context of the present invention advantageously performed using liquid refluxes. The liquid reflux used in the separation and the liquid reflux used in the further separation may be formed using at least a portion of the tops product from the separation. In this case it is possible to employ only one condenser system to provide refluxes for both columns. It is advantageous when the intermediate fraction is withdrawn from the separation in gaseous form. Alternatively it is also possible to form the liquid reflux used in the separation using at least a portion of the tops product from the separation as previously but to form the liquid reflux used in the further separation using at least a portion of the tops product formed in the further separation. In the latter case the intermediate fraction from the separation is in particular withdrawn in liquid form and transferred into the further separation. This makes it possible for example for the intermediate fraction to be conveyed by a pump and thus optionally combined from various plants over greater distances.

It is particularly advantageous when the separation and the further separation are in the context of the present invention performed under a (slight) vacuum, wherein both columns may be evacuated using a common vacuum system that is elucidated in detail with reference to the accompanying illustration. It is thus a particular advantage of this embodiment of the present invention that only one common vacuum system need be available for both columns. Operation under vacuum allows a lower temperature in the separation which provides the advantage that obstructions due to polymerization may be largely avoided. The recited disruptive components are formed from the monomer (methyl)dicyclopentadiene at elevated temperature and a reduced temperature therefore also suppresses formation of such compounds. In conventional fractionations the main point of origin of (methyl)dicyclopentadiene is a debutanizer, since high concentrations of the monomer and an elevated temperature are present here. However, the formation in the previously elucidated upstream separation steps is markedly lower so that pyrolysis gasoline from such steps is employed in the context of the present invention.

The present invention also relates to a plant for deriving polymerizable aromatic compounds having nine carbon atoms wherein the plant comprises means which adapted to form a component mixture at least partially by steam cracking, means adapted for subjecting the component mixture at least partially to a workup comprising a gasoline removal and thereafter a compression and a fractionation, and means which are adapted to form one or more pyrolysis gasoline fractions in the gasoline removal and/or during the compression. Provided according to the invention are means which are adapted for forming a separation feed comprising predominantly or exclusively pyrolysis gasoline from the or at least one of the pyrolysis gasoline fraction(s) which is or are formed in the gasoline removal and/or during the compression, and means which are adapted to at least partially subject the separation feed to a separation, wherein the separation is adapted to form at least one fraction which is, compared to the separation feed, enriched in polymerizable aromatic compounds having nine carbon atoms.

In terms of features and advantages of a corresponding plant which advantageously comprises means which allow it to perform the process in the embodiments elucidated hereinabove, reference is hereby explicitly made to the elucidations given hereinabove.

Embodiments of the invention are hereinbelow more particularly elucidated with reference to the accompanying drawings.

DETAILED DESCRIPTION OF THE DRAWINGS

In the figures that follow, elements that are mutually corresponding in terms of functionality or construction bear corresponding reference numerals and for the sake of simplicity are not repeatedly elucidated. The elucidations which follow relate to processes and corresponding plants in the same way. It will be appreciated that corresponding plants/processes may in practice also comprise optional or obligatory further components/process steps. These are not shown in the figures which follow merely for clarity.

Figure 1:
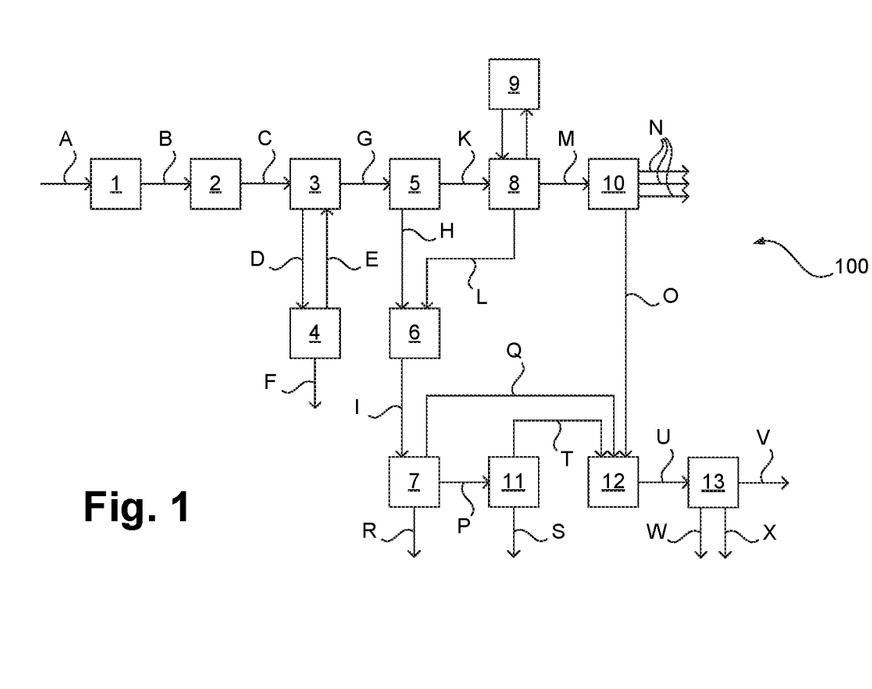
FIG. 1 shows a process according to one embodiment of the invention in the form of a schematic process flow diagram.

FIG. 1 shows a process according to a preferred embodiment of the present invention in the form of a schematic process flow diagram. The process overall is labelled 100.

In the process 100 one or more cracking inputs A together with steam are supplied to one or more cracking furnaces 1 which may be operated under identical or different cracking conditions and subjected to at least partial thermal cracking. In the example shown the cracking input(s) A comprise liquid inputs, in particular naphtha.

Withdrawn from the cracking furnace(s) 1 is/are one or more component mixtures B which are subjected to a rapid cooling 2 to bring the cracking reactions to an end and make the subsequent steps possible. This may be carried out using one or more transfer line exchangers.

After the cooling the component mixture now referred to as C is supplied to an oil removal 3 which may be performed in particular using one or more known oil columns having a circulating oil circuit (not shown in detail). In the oil removal 3 pyrolysis oil D is separated from the component mixture C in one or more fractions.

In the example shown the pyrolysis oil D is subjected to an oil stripping 4 to recover lighter compounds E separated with the pyrolysis oil D including in particular polymerizable aromatic compounds having 9 carbon atoms. These are recycled into the oil removal 3 in gaseous form, for example into the or into one of the oil columns used there.

The remainder F of the pyrolysis oil D remaining after the oil stripping 4 may partially be recycled in liquid form as reflux into the oil removal 3, for example onto the or onto one of the oil columns used there, and partially withdrawn from the process 100 as a product in the form of cracker oil (not shown in detail). In addition or as an alternative it is also possible for pyrolysis oil D not subjected to the oil stripping 4 to be recycled into the oil removal 3 as reflux.

A remainder G remaining after the oil removal 3 is supplied to a gasoline removal 5 in which for example a water quench column having a water circuit or other apparatuses are employed (not shown in detail). In the gasoline removal 5, (heavy) pyrolysis gasoline H is separated.

The heavy pyrolysis gasoline H is in the example shown at least partially supplied to a gasoline stripping 6 to remove light components. The latter may be withdrawn from the process, for example by flaring, or recycled into the process at a suitable point (not shown in detail). A portion of the heavy pyrolysis gasoline H may be recycled into the oil removal 3 before and/or after the gasoline stripping 6. Said portion may for example be applied as reflux to the or to one of the oil columns used.

The stripped pyrolysis gasoline obtained in the gasoline stripping 6 and now referred to as I is supplied to a separation 7 (referred to as a preseparation hereinafter) as more particularly elucidated hereinbelow. It may also be provided that a portion of the heavy pyrolysis gasoline H is supplied to the preseparation 7 directly without stripping.

A remainder K remaining after the gasoline removal 5 is in the example shown supplied to an especially multi-stage crude gas compression 8, in the course of which an acidic gas removal 9 may be carried out. For details, reference is made to the technical literature cited at the outset. Details and separated compounds are not shown. In the crude gas compression 6, further pyrolysis gasoline L may be separated and may for example likewise be supplied to the gasoline stripping 6 or be supplied directly to the preseparation 7.

The compressed component mixture M freed from acidic gases is supplied to a fractionation 10 in which a plurality of fractions, exemplarily shown here with N, are formed. The fractionation may be performed using any desired apparatuses. The fractions N comprise for example fractions comprising predominantly or exclusively compounds having two, three, four or more than four carbon atoms or corresponding collective fractions or specific hydrocarbons such as ethane or ethylene. The fractions N are sent to a suitable use.

The fractionation 10 may form further pyrolysis gasoline O which, however, for the reasons elucidated hereinabove is advantageously not supplied to the gasoline stripping 6/the preseparation 7. The use of said gasoline is more particularly elucidated hereinbelow.

Figure 2:
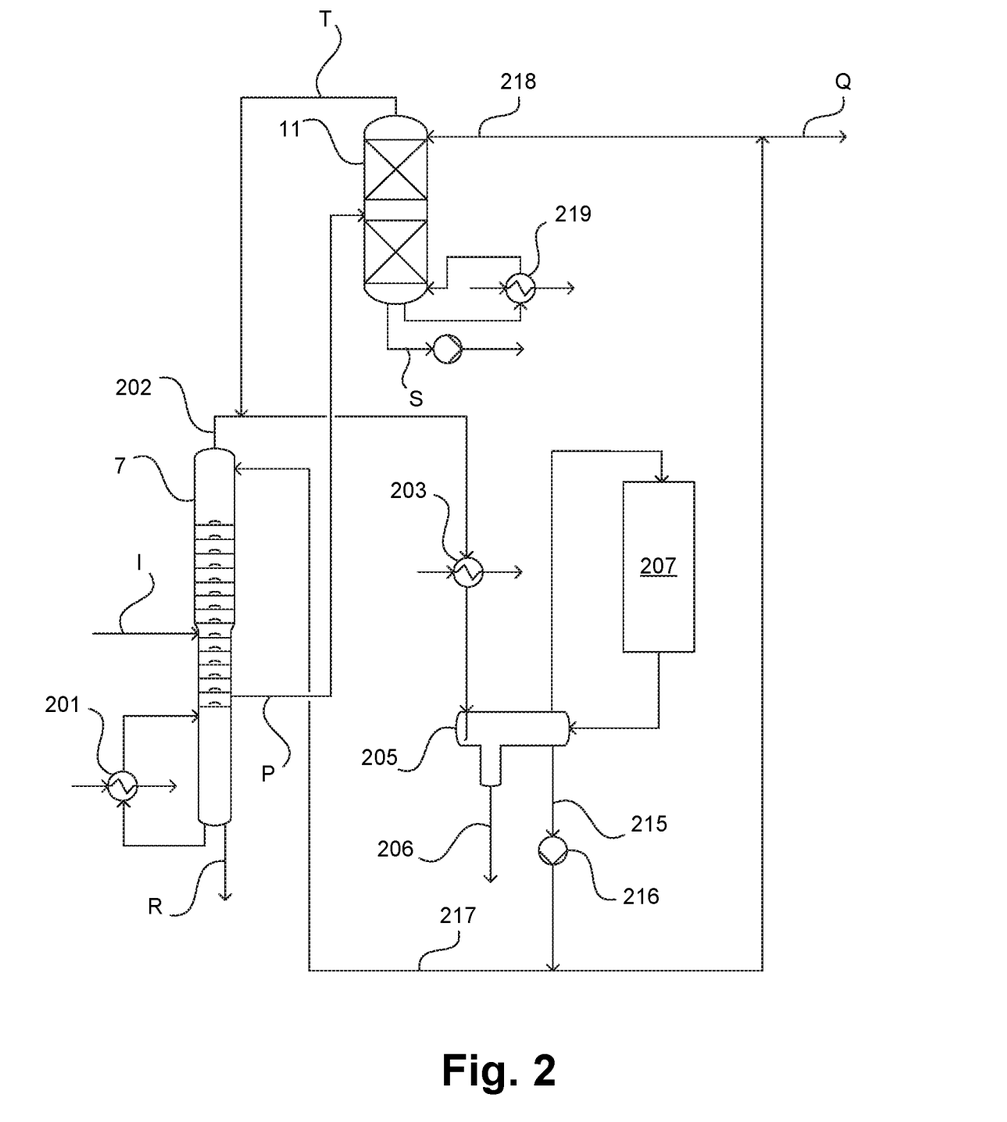
FIG. 2 shows a portion of a process according to one embodiment of the invention in the form of a schematic process flow diagram.

Formed in the preseparation 7 from the heavy pyrolysis gasoline H and optionally UI as further elucidated in FIG. 2 is a fraction P that is enriched in compounds having nine carbon atoms. These are in particular polymerizable aromatic compounds to the derivation of which the present invention is in particular directed. The fraction P is transferred into a further separation 11 (referred to as a fine separation hereinafter). Also formed is a fraction Q enriched in lighter compounds and a fraction R enriched in heavier compounds. The fraction Q may be supplied to a hydrogenation 12 and the fraction R may for example be recycled into the oil stripping 4.

Formed in the fine separation 11 are a product fraction S containing predominantly or exclusively the compounds having nine carbon atoms and a residual fraction T containing predominantly or exclusively other compounds. The latter may likewise be transferred into the hydrogenation 12. The abovementioned pyrolysis gasoline O may also be transferred into the hydrogenation 12.

A hydrogenated fraction U formed in the hydrogenation 12 may be supplied to an aromatics extraction in which in particular a fraction V containing predominantly or exclusively compounds having 5 to 8 carbon atoms and one or more heavier fractions W, X are formed.

FIG. 2 shows details of a process according to one embodiment of the invention, for example of the process 100 according to FIG. 1. The designation of the respective devices, material streams and fractions corresponds to FIG. 1. The embodiment shown in FIG. 2 may also be used in processes other than the process 100 shown in FIG. 1.

Heavy pyrolysis gasoline I in particular originating from a gasoline stripping 6 (see FIG. 1) and optionally intermediately stored in a tank is introduced into the preseparation 7 which in the example shown is undertaken using a column having conventional separating trays. In the example shown the preseparation 7 is carried out at a temperature level of 140° C. to 180° C., in particular of 150° C. to 165° C., in the bottom of the column, at a temperature level of 60° C. to 100° C., in particular of 70° C. to 90° C., at the top of the column and at a pressure level of 0.5 to 1 bar (abs.), in particular about 0.8 bar (abs.). The temperature at the top of the column depends in particular on the composition of the input (for example with/without hydrocarbons having five carbon atoms) and may vary accordingly.

The preseparation 7 is performed using a bottoms evaporator 201 which is for example heated using steam at a pressure level of about 22 bar. Withdrawn from the preseparation 7 is the material stream Q which comprises predominantly or exclusively compounds having 5 to 8 carbon atoms and constitutes a crude gasoline fraction. The heavier compounds are separated in liquid form and may be withdrawn in the form of the material stream R. The bottoms product from the preseparation 7 and thus the material stream R comprises typical oil components and secondary components such as dimers/oligomers having more than twelve carbon atoms and proportions of polymerizable aromatic compounds having 9 carbon atoms and concomitant components thereof. The material stream R is therefore advantageously recycled into the oil removal 3 (see FIG. 1) in order not to lose these compounds.

Withdrawable via a gas takeoff is the fraction P which is in particular enriched in polymerizable aromatic compounds having nine carbon atoms. However, this fraction/the material stream P still comprises a significant proportion of light disruptive/concomitant components (in particular styrene).

A material stream 202 formed as a tops product from the preseparation 7 is cooled in one or more heat exchangers 203 operable with cooling water for example and subsequently introduced into a water separator 205. Water which arrives in the water separator 205 in particular due to the evacuation elucidated hereinbelow is withdrawn in the form of a material stream 206.

The water separator 205 is brought to a slight vacuum of for example about 0.9 bar or less, for example about 0.8 or 0.7 bar, using a vacuum system 207 configured in a manner known per se and shown in highly simplified form.

Using a pump 216 a condensate 215 freed from water from the water separator 205 is conveyed partially as reflux 217 to the preseparation 7 and partially as reflux 218 to the fine separation 11. A further proportion may be withdrawn as the crude gasoline fraction Q (see FIG. 1) and worked up as elucidated hereinabove. In the example shown the preseparation 7 is undertaken using a packing column having two packing regions. The lower packing region may also be replaced by conventional separating trays.

The fine separation 11 is undertaken using a bottoms evaporator 219 which is heated using steam. The steam used in the bottoms evaporator 219 may subsequently be used for heating in the bottoms evaporator 201. In the fine separation 11 the product stream S is used as bottoms product and the material stream T is used as tops product. In a departure from the configuration of the process 100 according to FIG. 1 the latter is combined with the material stream 201. Although FIG. 2 shows that packings 11 are used in the fine separation, the fine separation 11 can also be performed using trays instead of packings.

The material stream P is supplied to the fine separation 11 in particular at a pressure level of 0.8 to 1 bar (abs.), for example about 0.9 bar (abs.) and at a temperature level of 150° C. to 160° C., for example about 156° C. The reflux 218 is supplied to the fine separation 11 in particular at a pressure level of 0.8 to 1 bar (abs.), for example about 0.9 bar (abs.) and in particular at a temperature level of 60° C. to 70° C., for example about 66 bar (abs.) The product stream S leaves the fine separation 11 in particular at a pressure level of 0.9 to 1.1 bar (abs.), for example about 1 bar (abs.), and at a temperature level of in particular 170° C. to 180° C., for example about 171° C. The material stream Q is discharged from the fine separation 11 at a pressure level of 0.8 to 1 bar (abs.), for example about 0.9 bar (abs.), and at a temperature level of 100° C. to 110° C., for example about 108° C.

Figure 3:
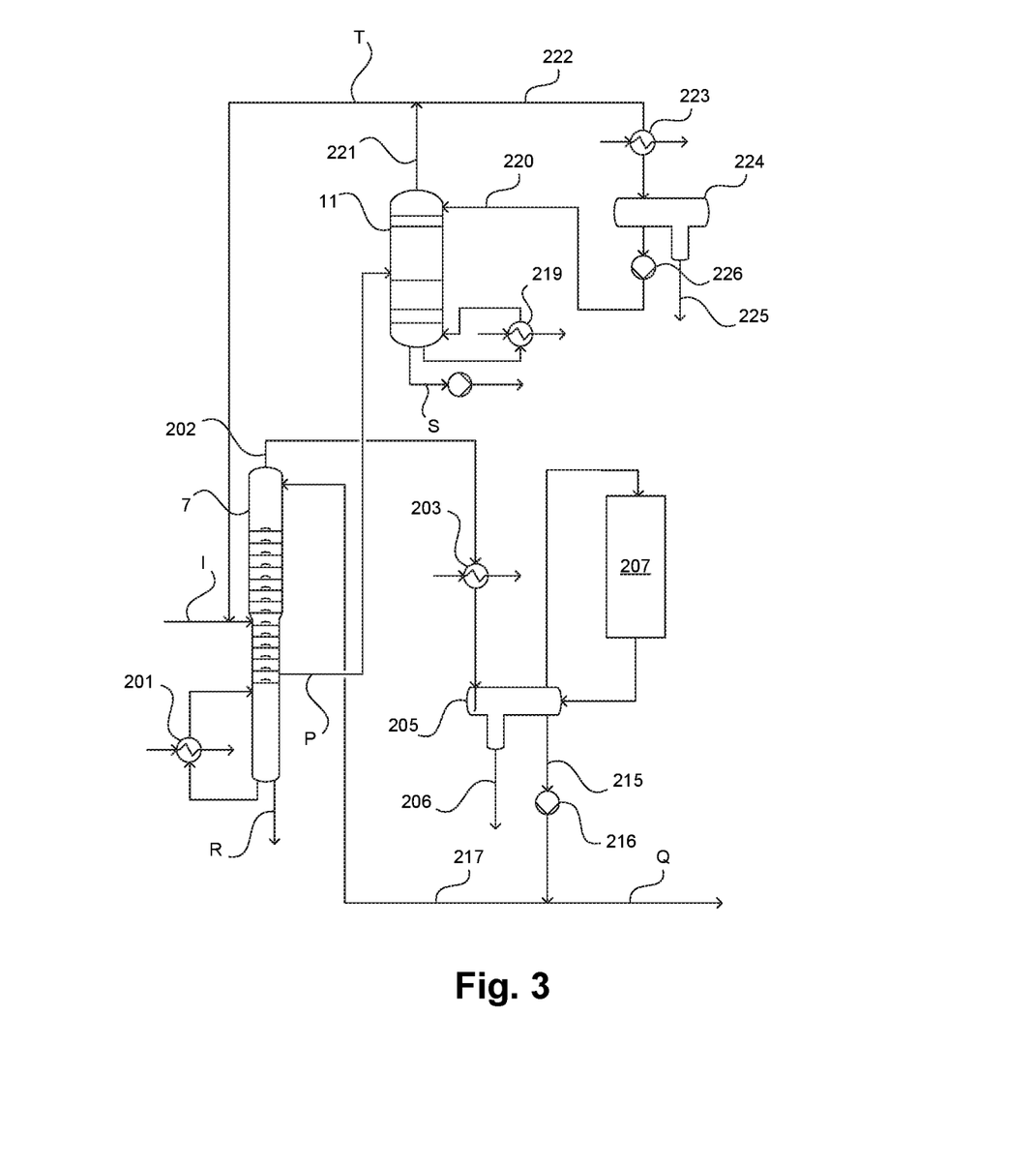
FIG. 3 shows a portion of a process according to one embodiment of the invention in the form of a schematic process flow diagram.

FIG. 3 shows details of a process according to one embodiment of the invention, for example of the process 100 shown in FIG. 1 in a configuration that is a departure from FIG. 2. The designation of the respective devices, material streams and fractions corresponds to FIGS. 1 and 2. The embodiment shown in FIG. 3 may also be used in processes other than the process 100 shown in FIG. 1.

The variant described in FIG. 3 differs in particular in the fine separation 11 which is here carried out using a tray column. Only a few trays selected at random are shown. The operation of the bottoms evaporator here also designated with 219 does not differ from the embodiment according to FIG. 2. However a reflux 220 used in the fine separation 11 is not formed using the material stream 216 but rather from tops gas formed in the fine separation itself. This tops gas is withdrawn in the form of a material stream 221.

A portion of the material stream 221 is in the form of the material stream T combined with the heavy pyrolysis gasoline I and sent back to the preseparation 7 to transfer components present into the fractions desired in each case. A further portion in the form of a material stream 222 is passed through a heat exchanger 223, cooled and introduced into a water separator 224. Water separated therein is withdrawn in the form of a material stream 225 and for example combined with the water of the material stream 205. Using a pump 226 the reflux 220 is conveyed back from the water separator 224 to the fine separation.

The invention claimed is:

1. Process (100) for deriving polymerizable aromatic compounds having nine carbon atoms (S) in which a component mixture (B) is formed at least partially by steam cracking, wherein the component mixture (B) is at least partially subjected to a workup sequence (2, 3, 4, 5) comprising a gasoline removal (5) and thereafter is subjected to a compression (8) and a fractionation (10), and wherein in the gasoline removal (5) and/or during the compression (8) one or more pyrolysis gasoline fractions (H, L) and in the fractionation (10) one or more further pyrolysis gasoline fractions (O) is or are formed, characterized in that a separation feed is formed which comprises more than 75% pyrolysis gasoline from the or at least one of the pyrolysis gasoline fractions (H, L) which is or are formed in the pyrolysis gasoline removal (5) and/or during the compression (8) and less than 25% pyrolysis gasoline from the one or more further pyrolysis gasoline fractions (O) from the fractionation (10), wherein the pyrolysis gasoline from the one or more further pyrolysis gasoline fractions (O) from the fractionation (10) is used in forming the separation feed only to a limited extent or not at all and in that the separation feed is at least partially subjected to a separation (7), wherein in the separation (7) at least one first fraction (P) enriched in aromatic compounds having nine carbon atoms compared to the separation feed is formed.

2. Process (100) according to claim 1, in which the at least one fraction (P) which is formed in the separation (7) is at least partially subjected to a further separation (11) as a further separation feed, a further fraction (S) being formed in the further separation (11) which is enriched in aromatic compounds with nine carbon atoms compared with the further separation feed.

3. Process (100) according to claim 1, in which the workup sequence (2, 3, 4, 5) comprises an oil removal (3) in which a pyrolysis oil-containing (D) fraction is formed in the oil removal (3), wherein in an oil stripping (4) components are stripped out of the pyrolysis oil-containing (D) fraction and recycled into the oil removal (3) in gaseous form.

4. Process (100) according to claim 1, in which forming the one or more pyrolysis gasoline fractions (H, L) in the gasoline removal (5) and/or during the compression comprises to form one or more pyrolysis gasoline-containing fractions (H) and stripping components from the one or more pyrolysis gasoline-containing fractions (H) in a gasoline stripping (6).

5. Process (100) according to claim 4, in which the or the at least one pyrolysis gasoline fraction (H, L) which is or are formed in the pyrolysis gasoline removal (5) and/or during the compression (8) is or are predominantly or exclusively withdrawn from the gasoline stripping (6).

6. Process (100) according to claim 1, in which the separation (7) is performed using a separating column comprising separating trays, wherein the intermediate fraction (P) from the separating column is withdrawn in gaseous form via a sidestream takeoff.

7. Process (100) according to claim 6, in which the separation (7) further forms a liquid bottoms product (R) comprising predominantly or exclusively compounds having more than nine carbon atoms and a gaseous tops product (202) comprising predominantly or exclusively compounds having less than nine carbon atoms.

8. Process (100) according to claim 7, wherein the at least one fraction (P) which is formed in the separation (7) is at least partially subjected to a further separation (11) as a further separation feed, a further fraction (S) being formed in the further separation (11) which is enriched in aromatic compounds with nine carbon atoms compared with the further separation feed, the further separation (11) being performed using a separating column into which in a middle region the intermediate fraction (P) is introduced.

9. Process (100) according to claim 8, in which the product fraction (S) is formed in the fine separation (11) as bottoms product and in which the fine separation (11) further forms a tops product.

10. Process (100) according to claim 9, in which the separating columns used for the preseparation (7) and for the fine separation (11) are heated using bottoms evaporators (201, 219) in which a common heating medium is employed.

11. Process (100) according to claim 9, in which the preseparation (7) and the fine separation (11) each use a liquid reflux.

12. Process (100) according to claim 11, in which the liquid reflux used in the preseparation (7) and the liquid reflux used in the fine separation (11) is formed using at least a portion of the tops product from the preseparation (7) or in which the liquid reflux used in the preseparation (7) is formed using at least a portion of the tops product from the preseparation (7) and in which the liquid reflux used in the fine separation (11) is formed using at least a portion of the tops product (7) formed in the fine separation.

13. Process (100) according to any of the preceding claims, in which the preseparation (7) and the fine separation (11) is performed under vacuum.

* * * * *